United States Patent [19]

Eustache

[11] Patent Number: 5,553,962
[45] Date of Patent: Sep. 10, 1996

[54] SCREEN WIPING APPARATUS

[75] Inventor: Jean-Pierre Eustache, Antony, France

[73] Assignee: Valeo Systems D'Essuyage, Montigny-le Bretonneux, France

[21] Appl. No.: 252,405

[22] Filed: Jun. 1, 1994

[30] Foreign Application Priority Data

Jun. 4, 1993 [FR] France ......................... 93 06724

[51] Int. Cl.$^6$ ........................................ F16C 11/04
[52] U.S. Cl. ........................ 403/154; 403/161; 403/24; 15/250.32
[58] Field of Search .................... 403/161, 162, 403/163, 150, 154, 155, 119, 24, 160, 151; 15/250.44, 250.32, 250.31

[56] References Cited

U.S. PATENT DOCUMENTS

| 2,965,411 | 12/1960 | Makela | 15/250.31 X |
|---|---|---|---|
| 3,227,001 | 1/1966 | Reese. | |
| 3,829,924 | 8/1974 | Dittrich et al.. | |
| 4,118,825 | 10/1978 | Hoebrechts et al. | 15/250.32 |
| 4,286,350 | 9/1981 | Ichise | 15/250.32 |
| 4,446,589 | 5/1984 | Malocco | 15/250.32 |
| 4,776,057 | 10/1988 | Beneteam et al. | 15/250.31 X |
| 4,840,075 | 6/1989 | Tucker | 403/154 X |

FOREIGN PATENT DOCUMENTS

| 2143398 | 2/1973 | France. | |
|---|---|---|---|
| 2458292 | 6/1976 | Germany | 15/250.32 |
| 2830507 | 1/1980 | Germany | 15/250.32 |
| 3434016 | 3/1986 | Germany | 15/250.32 |
| 1046640 | 10/1966 | United Kingdom. | |
| 1075222 | 7/1967 | United Kingdom. | |

Primary Examiner—Kenneth J. Dorner
Assistant Examiner—Harry C. Kim
Attorney, Agent, or Firm—Morgan & Finnegan, LLP

[57] ABSTRACT

A screen wiping apparatus comprises a crank which is coupled through a pivot pin to a crank arm, which may for example be part of a screen wiper arm, the pivot pin providing an articulation between the arm and the crank whereby to provide non-circular wiping. The pivot pin has a head joined by a first cylindrical portion to a second cylindrical portion of smaller diameter than the first, the head and the two cylindrical portions being coaxial with each other. The first cylindrical portion of the pivot pin passes through a sleeve fitted transversely in the crank, while the second cylindrical portion extends through the crank arm. At least one ring carried by the crank is immobilised against rotation with respect to the crank.

10 Claims, 1 Drawing Sheet

SCREEN WIPING APPARATUS

FIELD OF THE INVENTION

The present invention relates to a screen wiping apparatus of the type which has a crank articulated to a crank arm about an axis of rotation, the axis of rotation, or pivot axis, being defined by a pivot member which couples the crank and crank arm together. More particularly, the invention relates to a screen wiping apparatus providing a non-circular wiping action through such an arrangement in which a crank arm and a crank are articulated together.

BACKGROUND OF THE INVENTION

It is known to provide non-circular screen wiping through a crank and crank arm system defining a deformable quadrilateral, in the manner that is best disclosed in French published patent specification FR 1 546 319A. In that case, the crank defines one of the sides of the deformable quadrilateral, while the crank arm which is articulated to the crank is defined by a part of a screen wiper arm which carries a wiper blade.

In the arrangements already known from the prior art, the crank and the crank arm are coupled together through the pivot member, which defines the above mentioned axis of rotation and which has a head, a first cylindrical portion, and a second cylindrical portion which is of smaller diameter than the first cylindrical portion, with the head and the two cylindrical portions being coaxial with each other.

It is known to connect the second cylindrical portion of the pivot member to the crank arm by riveting the end of that cylindrical portion. However, the present Applicant has found that such a means of connection has various drawbacks.

Firstly, the axial stresses exerted on the pivot member during the riveting operation cause the crank arm to be weakened by upsetting the terminal end of the second cylindrical portion of the pivot member into the material that constitutes the crank arm itself.

In addition, since both the crank arm and the crank are made of a soft material, and in particular a Zamak based material, while the pivot member itself is of a hard material, it has been found that the crank undergoes considerable wear in contact with the pivot member. This wear reduces the useful life of the screen wiping apparatus, and/or leads to deterioration in the mechanical qualities of the articulation.

DISCUSSION OF THE INVENTION

An object of the present invention is to overcome the above mentioned drawbacks, by providing a screen wiping apparatus which includes an articulation that reduces the stresses on the crank arm and which avoids the occurrence of the wear between the crank and the pivot member mentioned above.

To this end, the invention provides a screen wiping apparatus having an articulation in which the first cylindrical portion of the pivot member extends through a sleeve which is arranged in the crank, with the second cylindrical member of the pivot member extending through a reinforcing element carried by the crank arm, and the crank carries at least one ring, with at least one said ring being immobilised against rotation with respect to the crank.

During assembly, the invention enables the force which is exerted axially on the pivot member to be transmitted essentially to the reinforcing element, while wear of the crank arm and/or of the crank is reduced due to the presence of the rings. The reinforcing element can be made of a material much more rigid than that of the pivot member, and may for example be of steel or bronze.

According to a preferred feature of the invention, the said ring, or a said ring, is interposed between the radial surface of the head of the pivot member and the corresponding radial surface of the said sleeve in the crank. This arrangement reduces wear between the crank and the head of the pivot member.

According to a further preferred feature of the invention, the said ring, or a said ring, is disposed between the radial surface of the reinforcing element and the corresponding radial surface of the sleeve in the crank. By virtue of this feature, the ring prevents any contact between the crank and the crank arm, and thereby reduces the wear of these two components.

According to yet another preferred feature of the invention, the reinforcing element is in the form of an insert carried by the crank arm.

According to another preferred feature of the invention, the reinforcing element consists of two plate elements arranged on either side of the crank arm.

These features enable the forces applied during riveting to be transmitted directly to the reinforcing element without affecting the crank arm.

According to yet a further preferred feature of the invention, the ring, or at least one said ring, has a central hole and a non-circular outer edge, for its immobilisation against rotation.

The ring, or at least one said ring, preferably has a notched outer edge for immobilising it against rotation. Alternatively, it may have a projecting element for the same purpose.

According to a further preferred feature of the invention, the said ring, or at least one said ring, has a slot for its immobilisation against rotation.

Other features and advantages of the invention will appear more clearly on a reading of the description of preferred embodiments of the invention which follows, and which is given by way of example only and with reference to the accompanying drawings.

DESCRIPTION OF PREFERRED EMBODIMENTS OF THE INVENTION

Figure 1:
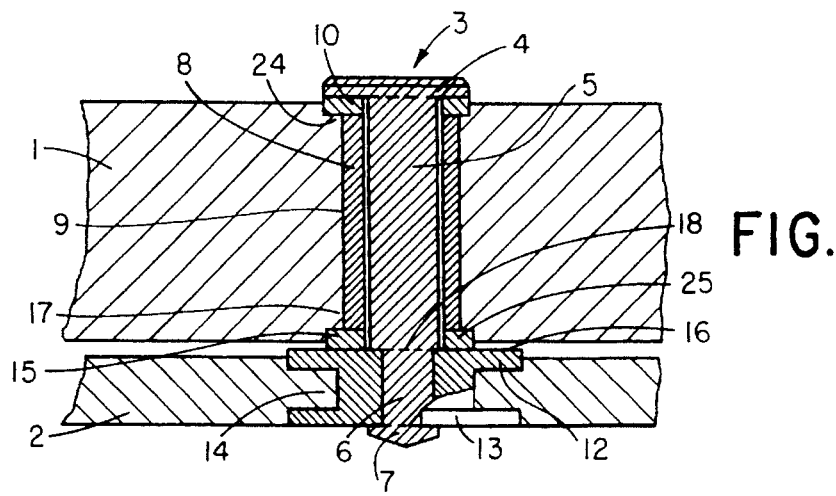
FIG. 1 is a view in cross section showing an articulation in a first embodiment of the invention.

Reference is first made to FIG. 1, in which a crank 1 and a crank arm 2 are coupled together through the articulation according to the invention, which provides relative rotation between the crank 1 and crank arm 2 about an axis of rotation defined by a pivot pin or member 3. In practice, the crank 1 and the crank arm 2 are made of a light alloy such as Zamak, or of a suitable plastics material or materials, while the pivot pin, 3 is a cylindrical component of a suitable rigid material, which in this example is stainless steel.

The pivot pin 3 has a head 4, a first cylindrical portion 5 and a second cylindrical portion 6, coaxial with each other. The diameter of the second cylindrical portion 6, which is joined by the portion 5 to the head 4, is smaller than that of the first portion 5. The opposite end or end portion, 7, to the head 4 of the pivot pin 3 is deformed in a known way, for example by riveting, in order to complete the coupling between the crank 1 and the crank arm 2, and so as to secure the pivot pin 3 on to the crank arm 2.

The first cylindrical portion 5 of the pivot pin 3 extends through a cylindrical sleeve or bearing ring 8 which is fitted into a bore 9, formed through the crank 1. The sleeve 8 may for example be a bronze bearing sleeve, or it may comprise a needle bearing.

As can be seen in FIG. 1, a first ring 10, of a high friction material, is interposed between the head 4 of the pivot pin 3 and the corresponding radial surface of the bearing ring 8, and has an outer diameter which is substantially equal to the diameter of the pivot pin head 4, while the internal diameter of the ring 10 is substantially equal to the diameter of the first cylindrical portion 5 of the pivot pin 3.

The crank 1 is formed with a seating 24 having a shape complementary to the cross section of the ring 10, and a depth which is at most equal to the thickness of this ring.

The ring 10 is immobilised against rotation with respect to the crank 1. As a result, friction occurs only between the lower surface of the head 4 of the pivot pin 3 and the upper surface of the ring 10, thus protecting the crank 1 from any wear effects due to friction by contact with the ring 10.

An insert 12 extends through the crank arm 2, on to which it is applied by moulding. The insert 12 is made of a material which is more rigid than that of the crank arm itself. In addition, the insert has a stop element 13 which prevents the insert from rotating with respect to the crank arm 2, while it is axially located in the latter by virtue of an external groove 14 formed around the insert 12.

A second ring 15, which is again of a high friction material, is interposed between the adjacent radial surface 16 of the insert 12 and the corresponding radial surface 17 of the sleeve 8. The internal diameter of the second ring 15 is substantially equal to the diameter of the first cylindrical portion 5 of the pivot pin 3. The crank 1 has a seating 25 of complementary shape to the external cross section of the second ring 15, the depth of this seating 25 being at most equal to the thickness of the ring 15.

The second ring 15 is immobilised against rotation with respect to the crank 1 in the same way as has already been described in connection with the first ring 10. As a result, friction effects occur only between the upper surface 16 of the insert 12 and the lower radial surface of the second ring 15.

The articulated assembly is put together by a method which includes a step of upsetting the end portion 7 of the pivot pin 3, this upsetting taking place during a riveting operation. During this operation, the stresses involved are exerted mainly in an axial direction, and only on the second cylindrical portion 6 of the pivot pin 3, being transmitted to the insert 12 lying between the upset end portion 7 of the pivot pin and thence to a thrust shoulder 18 which is defined at the junction of the first and second cylindrical portions 5 and 6 of the latter. In this way the insert 12 constitutes a reinforcing element for the crank arm 2.

Figure 2:
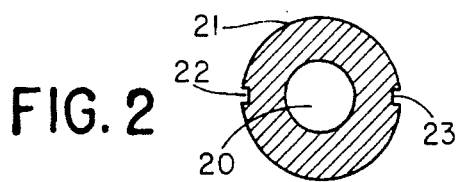
FIG. 2 is a front view of a first embodiment of a ring used in an articulation according to the invention.

Reference is now made to FIG. 2, showing a first embodiment of a ring 10 or 15, in which the ring has a cylindrical internal bore 20 and a cylindrical peripheral edge 21, which is formed with two slots 22 and 23. In this example these slots are diametrically opposed to each other. The two slots 22 and 23 cooperate with complementary projections (not shown) which are arranged in the seatings 24 and 25 in the crank 1 so as to prevent the ring 10 or 15 from rotating.

Figure 3:
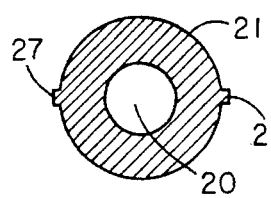
FIG. 3 is a front view showing another embodiment of such a ring.

An alternative embodiment for a ring 10 or 15 is shown in FIG. 3. In this embodiment the ring again has a cylindrical internal bore 20 and a cylindrical peripheral edge 21, but in this case it has two projections 26 and 27 which extend radially outwardly so as to create an asymmetry which prevents the ring from rotating in its seating. These projections 26 and 27 cooperate with recesses (not shown) which are arranged correspondingly in the seatings 24 and 25, again in order to prevent the ring 10 or 15 from rotating in its seating.

Figure 4:
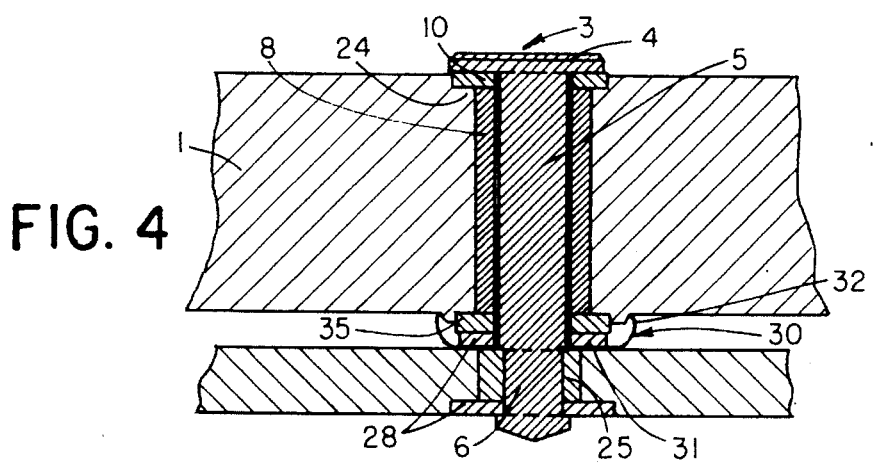
FIG. 4 is a view in cross section, similar to FIG. 1 but showing a second embodiment of an articulation according to the invention.

Reference is now made to FIG. 4, showing a second embodiment of the articulation in accordance with the invention. As can be seen in FIG. 4, the reinforcing element here comprises two plate members 28, which in this example are circular and which are arranged on either side of the crank arm 2. The second cylindrical portion 6 of the pivot pin 3 passes through these two plate members (or rings) 28, which are of a material more rigid than that of the crank arm 2.

Preferably, though this is not essential, a sleeve 29 of the same material as the rings 28 may be provided, this ring 29 surrounding the second cylindrical portion 6 of the pivot pin. In addition, it can be arranged that the pivot pin 3 carries a seal 30 which has a central portion 31 gripped between one of the rings 28 (i.e. the one which lies nearest to the crank 1) and that face of the crank arm 2 on which this latter ring bears. The central portion 31 of the seal 30 is extended by a tubular portion 32 of the seal, bearing on a cylindrical shoulder 35 which is arranged on the lower surface of the crank 1.

Figure 5:
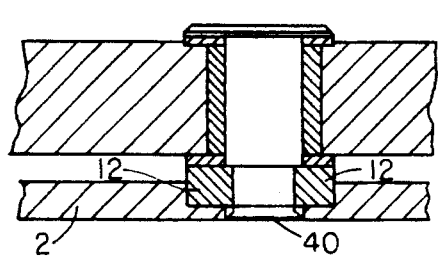
FIG. 5 is a view in cross section showing an articulation in a third embodiment according to the invention.

Referring now to FIG. 5, the insert 12 is here of a tubular shape and is immobilised against rotation with respect to the crank arm 2. In this connection, it has for example a non-circular shape which cooperates with a recess of complementary shape formed in the crank arm 2, while the end of the pivot pin is upset over the insert so as to define a widened end portion 40 of the pivot pin, thus preventing axial movement of the pivot pin with respect to the crank arm 2.

Figure 6:
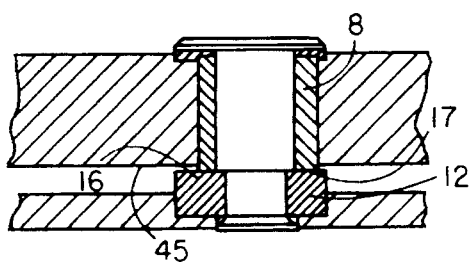
FIG. 6 is a view in cross section showing a fourth embodiment of an articulation according to the invention.

In the further embodiment shown in FIG. 6, to which reference is now made, the radial surface 17 of the sleeve 8 here projects with respect to the lower surface 45 of the crank 1. As a result, friction effects occur only between this radial surface 17 and the radial surface 16 of the insert 12.

It will be understood that the invention is not limited to the various embodiments described above and shown in the drawings, but that it embraces all variants within the scope of the appended Claims. In particular, for the purpose of immobilising the rings 10 and 15 against rotation with respect to the crank 1, the outer periphery of these rings may not be circular. It may for example be of a suitable polygonal shape, or alternatively it may be formed with any number of projections cooperating with complementary recesses.

What is claimed is:

1. Screen wiper apparatus comprising a crank, a crank arm, and a pivot member coupling the crank to the crank arm so as to articulate the crank and crank arm for relative rotation, the pivot member having a head, a first cylindrical portion, and a second cylindrical portion joined to the head by the first cylindrical portion, the diameter of the second cylindrical portion being smaller than that of the first cylindrical portion, the two cylindrical portions and the head of the pivot member all being coaxial with respect to each other, the apparatus further including: a sleeve arranged transversely in the crank with the first cylindrical portion of the pivot member extending through the sleeve; a reinforcing element carried by the crank arm, with the second cylindrical portion of the pivot member extending through the reinforcing element; and at least one ring carried by the crank, with the ring and the crank together defining means for preventing rotation of the ring with respect to the crank.

2. Apparatus according to claim 1 wherein, the head of the pivot member and the sleeve each defining a radial surface thereof in facing relationship with each other, the ring being interposed between the radial surfaces.

3. Apparatus according to claim 1, wherein, the reinforcing element and the sleeve each defining a radial surface thereof in facing relationship with each other, the ring being interposed between the radial surfaces.

4. Apparatus according to claim 1, wherein the reinforcing element comprises an insert carried by the crank arm.

5. Apparatus according to claim 1, wherein the reinforcing element comprises two plate member arranged on either side of the crank arm.

6. Apparatus according to claim 1, wherein the ring has a circular central aperture and a non-circular external edge for immobilising the ring against rotation with respect to the crank.

7. Apparatus according to claim 1, wherein the means for preventing rotation of the ring with respect to the crank comprises a notched outer edge thereof.

8. Apparatus according to claim 1, wherein the means for preventing rotation of the ring with respect to the crank comprises a projection thereof.

9. Apparatus according to claim 1, wherein the means for preventing rotation of the ring with respect to the crank comprise a notch formed therein.

10. Apparatus according to claim 1, further including a sealing element defining a central portion and a tubular portion surrounding the central portion, the crank defining a cylindrical transverse extension thereof towards the crank arm, the transverse extension defining a shoulder, with the central portion of the sealing element being secured to the reinforcing element and its tubular portion bearing radially on the shoulder.

* * * * *